US006806013B2

(12) United States Patent
Morrison et al.

(10) Patent No.: US 6,806,013 B2
(45) Date of Patent: Oct. 19, 2004

(54) LIQUID INKS COMPRISING STABILIZING PLASTISOLS

(75) Inventors: Eric D. Morrison, W. St. Paul, MN (US); Kam W. Law, Woodbury, MN (US); Julie Yu Qian, Woodbury, MN (US); James A. Baker, Hudson, WI (US); Christopher J. Wolters, West St. Paul, MN (US)

(73) Assignee: Samsung Electronics Co. Ltd., Suwon (KR)

( * ) Notice: Subject to any disclaimer, the term of this patent is extended or adjusted under 35 U.S.C. 154(b) by 130 days.

(21) Appl. No.: 10/177,640

(22) Filed: Jun. 20, 2002

(65) Prior Publication Data

US 2003/0032700 A1 Feb. 13, 2003

Related U.S. Application Data

(60) Provisional application No. 60/311,645, filed on Aug. 10, 2001, and provisional application No. 60/338,113, filed on Nov. 9, 2001.

(51) Int. Cl.$^7$ .......................... G03G 9/135; G03G 15/10
(52) U.S. Cl. ...................................... 430/114; 430/117
(58) Field of Search ............................... 430/117, 114; 523/160, 161

(56) References Cited

U.S. PATENT DOCUMENTS

| | | | |
|---|---|---|---|
| 4,623,558 A | 11/1986 | Lin ............................... 427/44 |
| 4,877,698 A | 10/1989 | Watson et al. ................. 430/45 |
| 4,923,778 A | 5/1990 | Blair et al. ................... 430/137 |
| 4,988,602 A | 1/1991 | Jongewaard et al. ......... 430/115 |
| 5,066,559 A | 11/1991 | Elmasry et al. .............. 430/111 |
| 5,108,863 A | 4/1992 | Hsieh et al. .................. 430/109 |
| 5,298,355 A | 3/1994 | Tyagi et al. .................. 430/110 |
| 5,298,356 A | 3/1994 | Tyagi et al. .................. 430/110 |
| 5,306,590 A | 4/1994 | Felder ........................ 430/115 |
| 5,312,711 A | 5/1994 | Tavernier et al. ............ 430/110 |
| 5,399,454 A | 3/1995 | Imai et al. ................... 430/109 |
| 5,510,219 A | 4/1996 | Agata et al. ................. 430/106 |
| 5,629,367 A | 5/1997 | Lofftus et al. ................. 524/88 |
| 5,760,257 A | 6/1998 | Tanaka et al. ................ 554/36 |
| 5,792,584 A | 8/1998 | Almog ........................ 430/137 |
| 5,908,727 A | 6/1999 | Kawaji et al. ............... 430/110 |
| 5,968,702 A | 10/1999 | Ezenyilimba et al. ....... 430/111 |
| 5,998,075 A | 12/1999 | Fujiwara et al. ............ 430/106 |
| 5,998,081 A * | 12/1999 | Morrison et al. ........... 430/117 |
| 6,037,090 A | 3/2000 | Tanaka et al. ............... 430/106 |
| 6,117,607 A | 9/2000 | Shimizu et al. ............. 430/110 |
| 6,146,803 A | 11/2000 | Landa et al. ................ 430/114 |
| 6,183,928 B1 | 2/2001 | Sata et al. ................... 430/110 |
| 6,261,732 B1 * | 7/2001 | Morrison et al. ........... 430/117 |

\* cited by examiner

*Primary Examiner*—John L Goodrow
(74) *Attorney, Agent, or Firm*—Mark A. Litman & Associates, P.A.

(57) ABSTRACT

This invention relates to a liquid ink for developing electrophotographic images comprising:
  a) a carrier liquid having a Kauri-Butanol number less than 30;
  b) a plastisol;
  c) a dispersant; and
  d) a charge director
wherein:
  a. for a positive charge director, the dispersant has amine groups and the plastisol comprises polymeric particles having acid groups and an acid value between 30 and 150 mg KOH/g such that the mole ratio of the amine groups to the acid groups is between 0.075 and 0.3; and
  b. for a negative charge director, the plastisol comprises a polymer having an amine value between 5 and 200 mg KOH/g and the dispersant has acid groups such that the mole ratio of the acid groups to the amine groups is between 0.075 and 0.3.

22 Claims, No Drawings

LIQUID INKS COMPRISING STABILIZING PLASTISOLS

This application claims the benefit under 35 USC 119(e) of U.S. Provisional Application No. 60/311,645, filed Aug. 10, 2001, and U.S. Provisional Application No. 60/338,113, filed Nov. 9, 2001.

BACKGROUND OF THE INVENTION

1. Field of the Invention

This invention relates to liquid ink compositions comprising a charge director, a plastisol having either acid or amine groups, and a dispersant. In particular, this invention relates to a liquid ink which exhibits improved dispersion stability and improved chargeability when used in any imaging process, including but not limited to ink transfer processes, ionographic, electrographic and electrophotographic color printing or proofing processes.

2. Background of the Art

Liquid inks are widely used in a variety of imaging and printing processes, for example offset, bubble jet, ink jet, intaglio, rotogravure, electrographic, and electrophotographic printing. Many characteristics desired in pigment dispersions for liquid inks are the same for each of the respective processes even though the final ink formulations may be substantially different. For example, the stability of the pigment dispersion on the shelf, under shear conditions, and under high voltage fields is an important consideration regardless of the final use of the liquid ink. The art continuously searches for more stable pigment dispersions to provide more flexibility in ink formulations to provide better efficiency and waste reduction in the various printing processes.

In electrophotographic applications, which includes devices such as photocopiers, laser printers, facsimile machines and the like, liquid inks are referred to as liquid toners or developers. Generally, the electrophotographic process includes the steps of forming a latent electrostatic image on a charged photoconductor by exposing the photoconductor to radiation in an imagewise pattern, developing a temporary image on the photoconductor by contacting the photoconductor with a liquid ink, and finally transferring the temporary image to a receptor. The final transfer step may be performed either directly from the photoconductor or indirectly through an intermediate transport member. The developed image is usually subjected to heat and/or pressure to permanently fuse the image to the receptor.

Liquid inks typically comprise an electrically insulating liquid that serves as a carrier for a dispersion of charged particles, known as toner particles. These toner particles are composed of at least a colorant (e.g., pigment or dye) and a polymeric binder. A charge control agent is often included as a component of the liquid developer to regulate the polarity and magnitude of the charge on the toner particles. Liquid inks can be categorized into two primary classes. For convenience, the two classes will be referred to as plastisol inks and organosol inks.

Organsol inks comprise a grafted copolymer comprising a thermoplastic resinous core and a copolymeric steric stabilizer, whereas plastisol inks comprise a plastisol which is a dispersion prepared by dispersing finely divided polymer particles in a liquid medium in which the polymer is insoluble.

One problem in formulating liquid inks is the difficulty in obtaining liquid inks that have excellent dispersion stability.

Hence, there is a need for liquid ink compositions having excellent dispersion stability.

An important consideration in formulating liquid inks is the chargeability of the liquid ink. It is desirable for a liquid ink to have a high chargeability so that it can acquire enough quantity of charge to be forced under an electrical field to migrate and then to plate upon the imaged areas on the photoreceptor. The chargeability of a liquid ink is measured by its conductivity and its mobility. In general, liquid inks with proper ink conductivity and proper ink mobility are desirable.

U.S. Pat. No. 4,623,558 (Lin), the disclosure of which is totally incorporated herein by reference, discloses a thermosetting plastisol dispersion composition comprising (1) poly (phenylene oxide) in powder form, which is insoluble in the reactive plasticizer at room temperature and plasticizable at a temperature at or above the fluxing temperature; (2) a liquid reactive plasticizer member of the group consisting of (a) at least one epoxide resin having an average of more than one epoxide group in the molecule, (b) at least one liquid monomer, oligomer, or prepolymer containing at least one ethylenically unsaturated group, and (c) a mixture of (a) and (b), said reactive plasticizer being capable of solvating the poly(phenylene oxide) at the fluxing temperature and being present in an amount ranging from 5 to 2,000 parts per 100 parts by weight of (1); and (3) 0.01 to 10 percent by weight of (2) of either a thermal initiator or photoinitiator for plasticizers present in the composition. The plastisol dispersion after fluxing can form a thermoset after the crosslinking reaction.

This invention provides a stable liquid ink comprising a plastisol with a novel composition that exhibits increased dispersion stability and improved chargeability.

SUMMARY OF THE INVENTION

This invention relates to a liquid ink for developing electrophotographic images comprising: a) a carrier liquid having a Kauri-Butanol number less than 30; b) a plastisol; c) a dispersant; and d) a charge director, wherein: for a positive charge director, the dispersant has amine groups and the plastisol comprises polymeric particles having acid groups and an acid value between 30 and 150 mg KOH/g such that the mole ratio of the amine groups to the acid groups is between 0.075 and 0.3; and for a negative charge director, the plastisol comprises polymer particles having an amine value between 5 and 200 mg KOH/g and the dispersant has acid groups such that the mole ratio of the acid groups to the amine groups is between 0.075 and 0.3.

In another aspect, the invention features a plastisol liquid ink that includes:
a) a carrier liquid having a Kauri-Butanol number less than 30;
b) a plastisol wherein a plastic particle component of the plastisol has acid groups and an acid value between 30 and 150 mg KOH/g;
c) a dispersant having amine groups such that the mole ratio of the amine groups to the acid groups is between 0.075 and 0.3; and
d) a positive charge director.

In still another aspect, the invention describes a plastisol liquid ink that includes:
a) a carrier liquid having a Kauri-Butanol number less than 30;
b) a plastisol wherein a plastic particle component of the plastisol has an amine value between 5 and 200 mg KOH/g;

c) a dispersant having acid groups such that the mole ratio of the acid groups to the amine groups is between 0.075 and 0.3; and d) a negative charge director.

The plastisol liquid inks of the present invention will be described primarily with respect to electrophotographic office printing; however, it is to be understood that these liquid toners are not so limited in their utility and may also be employed in other imaging processes, other printing processes, or other ink transfer processes, such as high speed printing presses, photocopying apparatus, microfilm reproduction devices, facsimile printing, ink jet printer, instrument recording devices, and the like.

DETAILED DESCRIPTION OF THE INVENTION

A plastisol liquid ink composition is provided comprising a mixture of colorant, a charge control agent, a dispersant, and a plastisol comprising polymeric particles dispersed in a liquid having a Kauri-Butanol (KB) number less than 30. "Kauri-Butanol" refers to an ASTM Test Method designated as D1133-54T. The Kauri-Butanol Number (KB) is a measure of the tolerance of a standard solution of kauri resin in 1-butanol to an added hydrocarbon diluent and is measured as the volume in milliliters (mL) at 25° C. of the solvent required to produce a certain defined degree of turbidity when added to 20 g of a standard kauri-1-butanol solution. Standard values are toluene (KB=105) and 75% by volume of heptane with 25% by volume toluene (KB=40). The ink is referred to in the art as a plastisol ink as two of the components, the polymeric particles and the liquid having a KB value of less than 30 are added as a plastisol or mixed in the combination of total materials in the ink to form or act in the manner of a plastisol.

The term plastisol is understood with its special meaning within the field of electrophotography and electrophotographic compatibale inks. The term plastisol represent a particle dispersion, such as a thermosetting plastisol particle dispersion composition comprising having a polymer particle (by way of non-limiting examples, e.g., acrylic polymers and copolymers, acrylamide polymers, acid group derivatized acrylic polymers, acid derivatized acrylamide polymers, basic group derivatized acrylic polymers, basic group derivatized acrylamide polymers and copoly (phenylene oxide)) in powder form. To be a plastisol, the particle is insoluble in the plasticizer or solvent at room temperature and plasticizable (softenable, dispersible or fluid) at a temperature at or above the fluxing temperature or the temeperature at which the polymer particle is combined at elevated temperatures with other materials to form the dispersion. The plastisol dispersion after formation or fluxing may be able to form a thermoset after the crosslinking reaction. BY the term 'derivatized' is meant that the underlying compound (e.g., an acrylamide polymer) has a pendant or terminal group added to the polymeric structure (to the monomer so that it remains on the polymer after polymerization of the monomer or to the finished polymer so that the added group provides the properties desired from that group).

The carrier liquid may be selected from a wide variety of materials that are known in the art, but the carrier liquid preferably has a Kauri-Butanol number less than 30. The liquid is typically oleophilic, chemically stable under a variety of conditions, and electrically insulating. Electrically insulating refers to a liquid having a low dielectric constant and a high electrical resistivity. Preferably, the liquid has a dielectric constant of less than 5, more preferably less than 3. Electrical resistivities of carrier liquids are typically greater than $10^9$ Ohm-cm, more preferably greater than $10^{10}$ Ohm-cm. The carrier liquid preferably is also relatively nonviscous to allow movement of the charged particles during development, and sufficiently volatile to permit its timely removal from the final imaged substrate, but sufficiently non-volatile to minimize evaporative losses in the stored developer. In addition, the carrier liquid should be chemically inert with respect to the materials or equipment used in the liquid electrophotographic process, particularly the photoreceptor and its release surface.

Non-limiting examples of suitable carrier liquids include aliphatic hydrocarbons (n-pentane, hexane, heptane and the like), cycloaliphatic hydrocarbons (cyclopentane, cyclohexane and the like), aromatic hydrocarbons (benzene, toluene, xylene and the like), halogenated hydrocarbon solvents (chlorinated alkanes, fluorinated alkanes, chlorofluorocarbons, and the like), silicone oils and blends of these solvents. Preferred carrier liquids include branched paraffinic solvent blends such as Isopar™ G, Isopar™ H, Isopar™ K, Isopar™ L, Isopar™ M and Isopar™ V (available from Exxon Corporation, N.J.), and most preferred carriers are the aliphatic hydrocarbon solvent blends such as Norpar™ 12, Norpar™ 13 and Norpar™ 15 (available from Exxon Corporation, N.J.).

The binders suitable for this invention may be any plastisol containing either acid groups or amine groups both of which may interact strongly with colorant particles. Such strong interaction provides high ink dispersion stabilities. Dispersion stability and chargeability can be further improved by the addition of a dispersant with an opposite acidity or basicity to that of the plastisol. For example, if a positive charge director is used, a plastisol comprising acid groups and a dispersion having basic groups may be selected to make a positive ink of this invention. On the other hand, if a negative charge director is used, a plastisol comprising basic groups and a dispersion having acid groups may be selected to make a negative ink of this invention.

Preferred plastisols for this invention include acrylic copolymers such as Elvacite® resins available from Ineos Acrylics, Cordova Tenn.; Neocryl resins available from NeoResins, Wilmington Mass.; Joncryl™ resins available from Johnson Polymer, Sturtevant, Wis.; and Pliolite™ resins available from Goodyear Tire and Rubber Company, Akron, Ohio. Most preferred plastisols are those comprising acid groups such as Elvacite® 2776 resin from Ineos Acrylics, and Joncryl® 835 and 611 resins from Johnson Polymer; and those comprising basic groups such as Elvacite® EDP 296 from Ineos Acrylics.

The particle size has known effects on the performance of the inks and plastisols, but the particle size in the practice of the present invention has been found to be easily controllable and to provide ranges that are not common within the photoconductive ink trade. For example, the standard range of particle sizes found in some commercial products has been between about 4 and 6 microns. Larger sizes are more easily obtained, by reducing the milling activity on the particles, and sizes of 10, 12 and 15 microns can be made. These large sizes tend to provide images that are more opaque, which is not necessarily beneficial when multilayer/multicolor images are being provided. The opaque ink layers will obscure underlying images and underlying colors excessively. In the practice of the present invention, by using the specific methods of milling, and the specific materials used herein, the range of particles sizes can be controlled between about 0.5 to 15 microns. More importantly, the materials and methods described herein enable good control of the polymer and dispersion particle sizes within range of 0.50 to 15 microns, 0.5 to 5.0 microns, 0.5 to 4.0 microns, 0.5 to 3.5 microns, 0.5 to 3.0 micron 0.5 to 2.5 microns, 0.6 to 4.0 microns, 0.6 to 3.5 microns, 0.6 to 3.0 microns, 0.6 to 2.5 microns, 0.75 to 4.0 microns, 0.75 to 3.5 microns, 0.75 to 3.0 microns, and 0.75 to 2.5 microns.

Any conventional dispersing method may be used for effecting particle size reduction of the plastisol in preparation of the plastisol liquid inks. Non-limiting examples of suitable dispersing methods include high shear homogenization, ball-milling, attritor milling, high energy bead (sand) milling or other means known in the art.

A liquid ink utilizing the aforementioned plastisols may comprise colorant particles embedded in the plastisol resin. Useful colorants are well known in the art and include materials such as dyes, stains, and pigments. Preferred colorants are pigments that may be incorporated into the plastisol resin, are nominally insoluble in and nonreactive with the carrier liquid, and are useful and effective in making visible the latent electrostatic image. Non-limiting examples of typically suitable colorants include: phthalocyanine blue (C.I. Pigment Blue 15:1, 15:2, 15:3 and 15:4), monoarylide yellow (C.I. Pigment Yellow 1, 3, 65, 73 and 74), diarylide yellow (C.I. Pigment Yellow 12, 13, 14, 17 and 83), arylamide (Hansa) yellow (C.I. Pigment Yellow 10, 97, 105, 138 and 111), azo red (C.I. Pigment Red 3, 17, 22, 23, 38, 48:1, 48:2, 52:1, 81, 81:4 and 179), quinacridone magenta (C.I. Pigment Red 122, 202 and 209) and black pigments such as finely divided carbon (Cabot Monarch 120, Cabot Regal 300R, Cabot Regal 350R, Vulcan X72) and the like.

Any conventional dispersing method may be used for effecting particle size reduction of colorant particles in preparation of the plastisol liquid inks. Non-limiting examples of suitable dispersing methods include high shear homogenization, ball-milling, attritor milling, high energy bead (sand) milling or other means known in the art.

The optimal weight ratio of resin to colorant in the toner particles is on the order of 1/1 to 20/1, preferably between 3/1 and 10/1 and most preferably between 5/1 and 8/1. The total dispersed material in the carrier liquid typically represents 0.5 to 70 weight percent, preferably between 1 and 25 weight percent, most preferably between 2 and 12 weight percent of the total liquid developer composition.

An electrophotographic liquid toner may be formulated by incorporating a dispersant into the liquid ink. The dispersant may be a polymer that has a high affinity to both the toner particles and to the carrier liquid. It either completely or partially dissolves in the carrier liquid or swells with the carrier liquid.

These polymers are not specifically limited to, but may include polyolefins, polyvinyl alcohol, polyvinyl methylether, polyvinyl ethylether, polyethylene oxide, gelatine, methyl cellulose, methylhydroxypropyl cellulose, ethyl cellulose, sodium salts of carboxymethyl cellulose, starch, nitrogen-containing polymer, and acid-containing polymer. The preferred dispersants are nitrogen-containing polymers and acid-containing polymers.

Non-limiting examples of acid-containing polymeric dispersants are polyacrylic acid and hydrocarbon soluble copolymers thereof; polymethacrylic acid and hydrocarbon soluble copolymers thereof; polystyrenesulfonic acid and hydrocarbon soluble copolymers thereof; polyvinylsulfonic acid and hydrocarbon soluble copolymers thereof; styrene/ maleic acid copolymers and hydrocarbon soluble derivatives thereof; and vinyl methyl ether/maleic acid copolymers and hydrocarbon soluble derivatives thereof. All preferably, but not necessarily, with weight average molecular weights of 1,000 to 100,000. The preferred acidic polymeric dispersants are hydrocarbon soluble copolymers comprising acrylic acid, methacrylic acid, or their combinations. Useful commercial dispersants for this invention include Solsperse® 36600, Solsperse® 34750, Solsperse® 41000, and Solsperse® 28,000 (commercially obtained from Avecia Pigments and Additives Group, Charlotte, N.C.).

Non-limiting examples of nitrogen-containing dispersants are polyvinyl pyrrolidone, polyamine, polyethyleneimine, poly(meth)acrylates containing amine groups, copolymers of alkyl (meth)acrylate and (meth)acrylates containing amine groups, and their hydrocarbon soluble derivatives. The preferred dispersants for this invention are hydrocarbon soluble copolymers derived from tertiary amine monomers such as dimethylaminoethyl methacrylate. Useful commercial dispersants for this invention include Solsperse® 13940 (commercially obtained from Avecia Pigments and Additives Group, Charlotte, N.C.) and Disperbyk™ 116 (commercially obtained from Byk Chemie—USA, Inc., Wallingford, Conn.).

The dispersant is preferably added to the carrier liquid at an amount varies from 0.01% to 20% by weight for improving the dispersibility and preventing rise in viscosity of the carrier liquid due to addition of the dispersant. More preferably, the amount of the dispersant is in a range from 0.1% to 10% by weight.

The total weight of the solid components such as the toner, charge director and dispersant with respect to the total weight of the liquid developer is preferably in a range from about 1% to 90% by weight. For the purpose of reducing the total amount of the liquid developer used for the developing, and thereby facilitating the handling, the total amount of the solid components is more preferably in a range from 2% to 50% by weight.

An electrophotographic liquid toner may be formulated by incorporating a charge control agent into the liquid ink. The charge control agent, also known as a charge director, provides improved uniform charge polarity of the toner particles. The charge director may be incorporated into the toner particles using a variety of methods, such as chemically reacting the charge director with the toner particle, chemically or physically adsorbing the charge director onto the toner particle (resin or pigment), or chelating the charge director to a functional group incorporated into the toner particle. A preferred method is attachment via a functional group built into the dispersant. The charge director acts to impart an electrical charge of selected polarity onto the toner particles. Both conventional positive charge directors and negative charge director described in the art may be used.

The positive charge director may be organic acid metal salts consisting of polyvalent metal ions and organic anions as the counterion. Non-limiting examples of suitable metal ions include Ba(II), Ca(II), Mn(II), Zn(II), Zr(IV), Cu(II), Al(III), Cr(III), Fe(II), Fe(III), Sb(III), Bi(III), Co(II), La(III), Pb(II), Mg(II), Mo(III), Ni(II), Ag(I), Sr(II), Sn(IV), V(V), Y(III), and Ti(IV). Non-limiting examples of suitable organic anions include carboxylates or sulfonates derived from aliphatic or aromatic carboxylic or sulfonic acids, preferably aliphatic fatty acids such as stearic acid, behenic acid, neodecanoic acid, diisopropylsalicylic acid, abietic acid, naphthenic acid, octanoic acid, lauric acid, tallic acid, and the like. Preferred positive charge directors are the metallic carboxylates (soaps) described in U.S. Pat. No. 3,411,936, incorporated herein by reference, which include alkaline earth- and heavy-metallic salts of fatty acids containing at least 6–7 carbons and cyclic aliphatic acids including naphthenic acid; more preferred are polyvalent metal soaps of zirconium and aluminum; most preferred is zirconium octanoate (Zirconium HEX-CEM from Mooney Chemicals, Cleveland, Ohio).

Non-limiting examples of suitable negative charge directors are polymers or copolymers having nitrogen-containing monomer, quaternary ammonium block copolymers, lecithin, basic metallic petronates such as basic barium petronate, basic calcium petronate, and basic sodium petronate, metal naphthenate compounds, and polyisobutylene succinimide available as OLOA 1200 from Chevron Oronite Company LLC, Houston, Tex., and the like. Specific examples for the nitrogen-containing monomer are (meth) acrylates having an aliphatic amino group, vinyl monomers having nitrogen-containing heterocyclic ring, cyclic amide monomers having N-vinyl substituent, (meth)acrylamides, aromatic substituted ethlylenic monomers having nitrogen-containing group, nitrogen-containing vinyl ether monomers, etc. Particularly preferable is a copolymer which is soluble in a hydrocarbon carrier liquid and containing a monomer such as hexyl (meth)acrylate, cyclohexyl (meth) acrylate, 2-ethylhexyl (meth)acrylate, octyl (meth)acrylate, nonyl (meth)acrylate, decyl (meth)acrylate, dodecyl (meth) acrylate, lauryl (meth)acrylate, stearyl (meth)acrylate, vinyl laurate, vinyl stearate, benzyl (meth)acrylate and pheny (meth)acrylate. Preferred negative charge directors are lecithin, basic metallic petronate, and polyisobutylene succinimide.

The preferred charge direction levels for a given toner formulation will depend upon a number of factors, including the composition of the plastisol, the molecular weight of the plastisol, the particle size of the plastisol, the pigment used in making the toner, and the ratio of plastisol to pigment. In addition, preferred charge direction levels will also depend upon the nature of the electrophotographic imaging process, particularly the design of the developing hardware and photoreceptive element. Those skilled in the art, however, know how to adjust the level of charge direction based on the listed parameters to achieve the desired results for their particular application.

A liquid toner comprising a carrier liquid, a plastisol, a dispersant, a charge director, and a colorant can be formulated in various ways. This invention discovers that a positive liquid toner comprising a plastisol having acid groups an acid value between 30 and 150 mg KOH/g, a dispersant having amine groups such that the mole ratio of the amine group to the acid groups is between 0.075 and 0.3, and a positive charge director possesses unexpected dispersion stability and chargeability. The preferred mole ratio of the amine group to the acid groups is between 0.09 and 0.2. Furthermore, a negative liquid toner comprising a plastisol having an amine value between 20 and 200 mg KOH/g, a dispersant having acid groups such that the mole ratio of the acid group to the amine groups is between 0.075 and 0.3, and a negative charge director has unexpected dispersion stability and chargeability. The preferred mole ratio of the acid group to the amine groups is between 0.09 and 0.2.

An underlying aspect of the invention is the control of the properties of the charge director according to the nature of the charge directing properties (positive charge directing or negative charge directing. Where the charge director is a positive charge director, the dispersant has amine groups and the plastisol comprises polymeric particles having acid groups and an acid value between 30 and 150 mg KOH/g such that the mole ratio of the amine groups to the acid groups is between 0.075 and 0.3; and where the charge director is a negative charge director, the plastisol comprises a polymer having an amine value between 5 and 200 mg KOH/g and the dispersant has acid groups such that the mole ratio of the acid groups to the amine groups is between 0.075 and 0.3.

The acid value can be measured by a method according to JIS (Japanese Industrial Standard) K0070. Specifically, the dispersant or the plastisol is dissolved in a good solvent, and then phenolphthalein is added as an indicator. Titration is then carried out using a 0.1 mol/liter solution of potassium hydroxide in ethanol. The amount of the dispersant or plastisol, which is a sample, is 20 g, 10 g, 5 g, 2 g and 1 g in the case wherein the acid value is less than 5, not less than 5 and less than 15, not less than 15 and less than 30, not less than 30 and less than 100, and 100 or more, respectively. The acid value is calculated by using the value from the titration and the following equation:

$$\text{Acid value} = B \times F \times 5.611/S,$$

wherein B represents the amount (ml) of the 0.1 mol/liter solution of potassium hydroxide in ethanol which is required for the titration, F represents a factor of the 0.1 mol/liter solution of potassium hydroxide in ethanol, and S represents the weight (g) of a sample.

The amine value can be measured by a method according to JIS K 7237. Specifically, 8.5 ml of perchloric acid is added into a solution wherein 500 ml of acetic acid is beforehand mixed with 30 ml of acetic anhydride, and then mixed. Further, acetic acid is added into this mixture so that the total amount is 1000 ml. This mixture is permitted to stand a whole day and night to obtain a titrating solution. 100 ml of a solution of a mixture of 900 ml of o-nitrotoluene and 200 ml of acetic acid is added into a sample corresponding to 2–3 mmols of basic nitrogen, and then dissolved therein. Several drops of a 0.1 g/ 100 ml solution of Crystal Violet in acetic acid are then added into this mixture. Subsequently, titration is carried out by using the aforementioned perchloric acid until the blue color starts to turn greenish. The amine value is calculated by using the value from this titration and the following equation:

$$\text{Amine value} = 56.11 \times 0.1 \times (V_3 - V_4) \times F/M_2,$$

wherein $V_3$ represents the amount (ml) of the 0.1 mol/liter perchloric acid solution which is required for the titration, $V_4$ represents the amount (ml) of the 0.1 mol/liter perchloric acid solution which is required for a blank test, F represents the factor of the 0.1 mol/liter perchloric acid solution, and $M_2$ represents the weight (g) of a sample.

The conductivity of a liquid toner has been well established in the art as a measure of the effectiveness of a toner in developing electrophotographic images. The useful conductivity range is from about $1 \times 10^{-11}$ mho/cm to $10 \times 10^{-10}$ mho/cm. High conductivities generally indicate inefficient association of the charges on the toner particles and is seen in the low relationship between current density and toner deposited during development. Low conductivities indicate little or no charging of the toner particles and lead to very low development rates. The use of charge director compounds to ensure sufficient charge associated with each particle is a common practice. There has, in recent times, been a realization that even with the use of charge directors there can be much unwanted charge situated on charged species in solution in the carrier liquid. Such unwanted charge produces inefficiency, instability and inconsistency in the development.

Suitable efforts to localize the charges onto the toner particles and to ensure that there is substantially no migration of charge from those particles into the liquid, and that no other unwanted charge moieties are present in the liquid, give substantial improvements. As a measure of the required properties, we use the ratio between the conductivity of the carrier liquid as it appears in the liquid toner and the conductivity of the liquid toner as a whole (the completely constituted toner dispersion). This ratio should be less than 0.9, less than 0.6, preferably less than 0.4 and most preferably less than 0.3. Many prior art toners examined have shown ratios much larger than this, in the region of a ratio of 0.95.

In electrophotography, the electrostatic image is typically formed on a sheet, drum or belt coated with a photoreceptive element by (1) uniformly charging the photoreceptive element with an applied voltage, (2) exposing and discharging portions of the photoreceptive element with a radiation source to form a latent image, (3) applying a toner to the latent image to form a toned image, and (4) transferring the toned image through one or more steps to a final receptor sheet. In some applications, it may be desirable to fix the toned image using a heated pressure roller or other fixing methods known in the art.

While the electrostatic charge of either the toner particles or photoreceptive element may be either positive or negative, electrophotography as employed in the present invention is preferably carried out by dissipating charge on a positively charged photoreceptive element. A positively-charged toner is then applied to the regions in which the positive charge was dissipated using a liquid toner immersion development technique. This development may be accomplished by using a uniform electric field produced by a development electrode spaced near the photoreceptive element surface. A bias voltage is applied to the electrode intermediate to the initially charged surface voltage and the exposed surface voltage level. The voltage is adjusted to obtain the required maximum density level and tone reproduction scale for halftone dots without any background deposited. Liquid toner is then caused to flow between the electrode and the photoreceptive element. The charged toner particles are mobile in the field and are attracted to the discharged areas on the photoreceptive element while being repelled from the undischarged, non-image areas. Excess liquid toner remaining on the photoreceptive element is removed by techniques well known in the art. Thereafter, the photoreceptive element surface may be force dried or allowed to dry at ambient conditions.

The substrate for receiving the image from the photoreceptive element can be any commonly used receptor material, such as paper, coated paper, polymeric films and primed or coated polymeric films. Specially coated or treated metal or metallized surfaces may also be used as receptors. Polymeric films include plasticized and compounded polyvinyl chloride (PVC), acrylics, polyurethanes, polyethylene/acrylic acid copolymer, and polyvinyl butyrals. Commercially available composite materials such as those having the trade designations Scotchcal™, Scotchlite™, and Panaflex™ film materials are also suitable for preparing substrates.

The transfer of the formed image from the charged surface to the final receptor or transfer medium may be enhanced by the incorporation of a release-promoting material within the dispersed particles used to form the image. The incorporation of a silicone-containing material or a fluorine-containing material in the outer (shell) layer of the particle facilitates the efficient transfer of the image.

In multicolor imaging, the toners may be applied to the surface of the dielectric element or photoreceptive element in any order, but for colorimetric reasons, bearing in mind the inversion that occurs on transfer, it is sometimes preferred to apply the images in a specified order depending upon the transparency and intensity of the colors. A preferred order for a direct imaging or a double transfer process is yellow, magenta, cyan and black; for a single transfer process, the preferred order is black, cyan, magenta and yellow. Yellow is generally imaged first on the photoconductor to avoid contamination from other toners and to be the topmost color layer when transferred. Black is generally imaged last on the photoconductor due to the black toner acting as a filter of the radiation source and to be the bottom-most layer after transfer.

To function most effectively, liquid toners should have conductance values in the range of 50 to 1200 picomho-$cm^{-1}$. Liquid toners prepared according to the present invention have conductance values of from at least about 20 picomho-$cm^{-1}$ or from about 100 to 500 picomho-$cm^{-1}$ for a dispersion containing 3.0% or about 2.5% by weight solids.

Overcoating of the transferred image may optionally be carried out to protect the image from physical damage and/or actinic damage. Compositions for overcoatings are well known in the art and typically comprise a clear film-forming polymer dissolved or suspended in a volatile solvent. An ultraviolet light absorbing agent may optionally be added to the coating composition. Lamination of protective layers to the image-beating surface is also well known in the art and may be used with this invention.

These and other aspects of the present invention are demonstrated in the illustrative examples that follow. These examples are to be viewed as illustrative of specific materials falling within the broader disclosure presented above and are not to be viewed as limiting the broader disclosure.

Test Methods

The following test methods were used to characterize plastisols and liquid inks in the examples that follow:

Percent Solids of Liquid Ink

Percent solids of the plastisol solutions and ink dispersions were determined gravimetrically using a halogen lamp drying oven attachment to a precision analytical balance (commercially obtained from Mettler Instruments Inc., Hightstown, N.J.). Approximately two grams of sample were used in each determination of percent solids using this sample dry down method.

Particle Size

Toner particle size distributions were determined using a Horiba LA-900 laser diffraction particle size analyzer (commercially obtained from Horiba Instruments, Inc, Irvine, Calif.). Toner samples were diluted approximately 1/500 by volume and sonicated for one minute at 150 watts and 20 kHz prior to measurement. Toner particle size was expressed on a number-average basis in order to provide an indication of the fundamental (primary) particle size of the ink particles.

Toner Conductivity

The liquid toner conductivity (bulk conductivity, $k_b$) was determined at approximately 18 Hz using a Scientifica model 627 conductivity meter (commercially obtained from Scientifica Instruments, Inc., Princeton, N.J.). In addition, the free (dispersant) phase conductivity ($k_f$) in the absence of toner particles was also determined. Toner particles were removed from the liquid milieu by centrifugation at 5° C. for 1–2 hours at 6,000 rpm (6,110 relative centrifugal force) in a Jouan MR1822 centrifuge (commercially obtained from Jouan Inc., Winchester, Va.). The supernatant liquid was then carefully decanted, and the conductivity of this liquid was measured using a Scientifica Model 627 conductance meter. The percentage of free phase conductivity relative to the bulk toner conductivity was then determined as: 100% ($k_f/k_b$).

Particle Mobility

Toner particle electrophoretic mobility (dynamic mobility) was measured using a Matec MBS-8000 Electrokinetic Sonic Amplitude Analyzer (commercially obtained from Matec Applied Sciences, Inc., Hopkinton, Mass.). Unlike electrokinetic measurements based upon microelectrophoresis, the MBS-8000 instrument has the advantage of requiring no dilution of the toner sample in order to obtain the mobility value. Thus, it was possible to measure toner particle dynamic mobility at solids concentrations actually preferred in printing. The MBS-8000 measures the response of charged particles to high frequency (1.2 MHz) alternating (AC) electric fields. In a high frequency AC electric field, the relative motion between charged toner particles and the surrounding dispersion medium (including counter-ions) generates an ultrasonic wave at the same frequency of the applied electric field. The amplitude of this ultrasonic wave at 1.2 MHz can be measured using a piezoelectric quartz transducer; this electrokinetic sonic amplitude (ESA) is directly proportional to the low field AC electrophoretic mobility of the particles. The particle zeta potential can then be computed by the instrument from the measured dynamic mobility and the known toner particle size, dispersant liquid viscosity, and liquid dielectric constant.

EXAMPLES

Comparative Example A

A 0.5 liter vertical bead mill (Model 6TSG-1/4, commercially obtained from Aimex Co., Ltd., Tokyo, Japan) was charged with 390 g of 1.3 mm diameter Potters glass beads (commercially obtained from Potters Industries, Inc., Parsippany, N.J.), 60.0 g of Elvacite® 2776 resin (commercially obtained from Ineos Acrylics, Cordova Tenn.), 2.71 g of 6.15 weight percent Zr Hexcem solution (product of OMG Americas, Inc., Westlake, Ohio), 227 g of Norpar™ 12 (commercially obtained from Exxon, Houston Tex.), and 10.0 g of Cabot Monarch 120 black pigment (commercially obtained from Cabot Corporation, Billerica N.Y.). Elvacite® 2776 is characterized as an n-butyl methacrylate/methyl methacrylate copolymer with a Tg of 45° C. and an acid number of 80 mg KOH/g of polymer. The mill was operated at 1,000 RPM for 2 hours with a water/glycol mixture held at 70° C. circulating through the cell jacket. The water/glycol mixture temperature was reduced to 35° C. and the mill speed was increased to 2,000 rpm and milling was continued for an additional 2 hours to produce a black 17.2 weight percent non-volatile content liquid electrophotographic toner. The resulting toner had a conductivity of 0.9 pmho/cm and a volume average particle size of 3.6 microns. This experiment shows that a liquid ink prepared without Solsperse® hyperdispersant is essentially non-conductive.

Comparative Example B

Comparative Example B was prepared according to the procedure for Comparative Example A except that the vertical bead mill was charged with 60.0 g of Elvacite® 2927 resin (commercially obtained from Ineos Acrylics, Cordova Tenn.), 8.14 g of 6.15 weight percent Zr Hexcem solution, 216.9 g of Norpar™12, 10.0 g of Cabot Monarch 120 black pigment, and 15.0 g of 40% (w/w) Solsperse® 13940 hyperdispersant in petroleum distillate (commercially obtained from Avecia, Charlotte N.C.). Elvacite 2927 is characterized as an n-butyl methacrylate/methyl methacrylate copolymer with a Tg of 50° C. and an acid number of 3.5 mg KOH/g of polymer. The resulting toner was analyzed had 25.26 percent non-volatile by weight and had conductivity of 373 pmho/cm. The volume average particle size of the toner was 4.860 microns. When diluted to 3% (w/w) non-volatile content, the toner sample had 42 pmho/cm conductivity and 0.592E-10 $m^2$/V·sec particle mobility. The sample was centrifuged at 7500 rpm for 60 minutes at 5° C. and the conductivity of the supernatant liquid was measured and found to be 41.7 pmho/cm (99% of the conductivity of the 3% (w/w) toner sample is attributed to the soluble phase). This example shows that toner particles in a toner prepared using a binder resin that does not contain carboxylic acid groups are not charged and that the electrical conductivity of the ink sample is essentially all due to dissolved species, not toner particles.

Comparative Example C

Comparative Example C was prepared according to the procedure for Comparative Example B except that the vertical bead mill was charged with 60.0 g of Elvacite® 2776 resin in place of 60.0 g of Elvacite® 2923 resin, and the mill was operated at 1,000 RPM for 2 hours without water/glycol mixture circulating through the cell jacket followed by operation at 2,000 rpm for an additional 2 hours, also without water/glycol mixture circulating through the jacket. The maximum temperature attained during the milling was approximately 50° C. The resulting toner was analyzed had 24.74 percent non-volatile by weight and had conductivity of 7340 pmho/cm. The volume average particle size of the toner was 1.798 microns. When diluted to 3% (w/w) non-volatile content, the toner sample had 1165 pmho/cm conductivity and 0.244E-10 $m^2$/V·sec particle mobility. The sample was centrifuged at 7500 rpm for 60 minutes at 5° C. and the conductivity of the supernatant liquid was measured and found to be 1015 pmho/cm (87% of the conductivity of the 3% (w/w) toner sample is attributed to the soluble phase). This example shows that toner particles in a toner prepared by milling without heating using a binder resin that contains carboxylic acid groups and an amine functional dispersant are not highly charged and that the electrical conductivity of the ink sample is mostly due to dissolved species, not toner particles.

Example 1

A 0.5 liter vertical bead mill (Model 6TSG-1/4, Aimex Co., Ltd., Tokyo, Japan) was charged with 390 g of 1.3 mm diameter Potters glass beads (Potters Industries, Inc., Parsippany, N.J.), 60.0 g of Elvacite® 2776 resin, 8.14 g of 6.15 weight percent Zr Hexcem solution, 217 g of Norpar® 12, and 10.0 g of Cabot Monarch 120 black pigment, and 15.0 g of 40% (w/w) Solsperse® 13940 hyperdispersant in petroleum distillate. The mill was operated at 1,000 RPM for 2 hours with a water/glycol mixture held at 70° C. circulating through the cell jacket. The water/glycol mixture temperature was reduced to 35° C. The milling speed was increased to 2,000 RPM and the milling was continued for an additional 2 hours to produce a black liquid electrophotographic toner. The resulting toner had 25.09 percent non-volatile by weight and had conductivity of 391 pmho/cm.

The volume average particle size of the toner was 1.38 microns. When diluted to 3% (w/w) non-volatile, the toner sample had 20 pmho/cm conductivity and 1.51E-10 m²/V·sec particle mobility. The sample was centrifuged at 7500 rpm for 60 minutes at 5° C. and the conductivity of the supernatant liquid was measured and found to be 4 pmho/cm (20% of the conductivity of the 3% (w/w) toner sample is attributed to the soluble phase).

The 3% (w/w) working strength toner was tested on the printing apparatus described previously. The reflection optical density (ROD) was 1.04 at plating voltages of 600 volts.

Example 2

Example 2 was prepared according to the procedure for Example 1 except that Elvacite® 2776 resin was replaced by Joncryl™ 835 resin (a styrene-acrylic copolymer with a Tg of 50° C. and an acid number of 53 mg KOH/g of polymer, commercially obtained from Johnson Polymer, Sturtevant, Wis.). The concentrated ink had 23.17 percent non-volatile by weight and had a conductivity of 606 pmho/cm. The volume average particle size of the toner was 2.04 microns. When diluted to 3% (w/w) nonvolatile, the toner sample had 38 pmho/cm conductivity and 1.82E-10m²/V·sec particle mobility. The sample was centrifuged at 7500 rpm for 60 minutes at 5° C. minutes and the conductivity of the supernatant liquid was measured and found to be 1.6 pmho/cm (4% of the conductivity of the 3% (w/w) toner sample is attributed to the soluble phase).

The 3% (w/w) working strength toner was tested on the printing apparatus described previously. The reflection optical density (ROD) was 1.14 at plating voltages of 600 volts.

Example 3

Example 3 was prepared according to the procedure for Example 1 except that Elvacite® 2776 resin was replaced by Joncryl™ 611 resin (a styrene-acrylic copolymer with a Tg of 50° C. and an acid number of 52 mg KOH/g of polymer, commercially obtained from Johnson Polymer, Sturtevant, Wis.). The resulting ink had 23.70 percent non-volatile by weight and had a conductivity of 763 pmho/cm. The volume average particle size of the toner was 2.10 microns. When diluted to 3% (w/w) non-volatile content, the toner sample had 55 pmho/cm conductivity and 1.58E-10 m²/V·sec particle mobility. The sample was centrifuged at 7500 rpm for 60 minutes at 5° C. minutes and the conductivity of the supernatant liquid was measured and found to be 4.8 pmho/cm (9% of the conductivity of the 3% (w/w) toner sample is attributed to the soluble phase).

Example 4

A 0.5 liter vertical bead mill (Model 6TSG-1/4, Aimex Co., Ltd., Tokyo, Japan) was charged at room temperature with 390 g of 1.3 mm diameter Potters glass beads (Potters Industries, Inc., Parsippany, N.J.), 60.0 g of Elvacite® EDP 296 resin (commercially obtained from Ineos Acrylics, Cordova, Tenn.), 40.3 g of a 4.69 weight percent soy lecithin solution in Norpar® 12, 196 g of Norpar® 12, 10.0 g of Cabot Mogul L black pigment, and 3.75 g of Solsperse™ 28,000 hyperdispersant (commercially obtained from Avecia, Charlotte, N.C.). The mill was operated at 1,000 RPM for 2 hours with a water/glycol mixture held at 70° C. circulating through the cell jacket. The water/glycol mixture temperature was reduced to 35° C. and the mill speed was increased to 2,000 rpm and milling was continued for an additional 2.5 hours. The resulting toner had 24.1 percent non-volatile by weight and had a conductivity of 804 pmho/cm. The volume average particle size of the toner was 12.5 microns. When diluted to 3% (w/w) non-volatile, the toner sample had a conductivity (Kb) of 91 pmho/cm and −4.37 E-11 m²/Vsec particle mobility. The sample was centrifuged at 7500 rpm for 60 minutes at 5° C. and the conductivity (Kf) of the supernatant liquid was measured and found to be 80 pmho/cm (the ratio of kf/kb=0.88; i.e. 88% of the conductivity of the 3% (w/w) toner sample is attributed to the free phase).

Example 4 shows that toner particles in an ink prepared using a plastisol binder resin that contains amine groups plus a carboxylic acid functional dispersant are negatively charged with a useful value of electrophoretic mobility.

A number of embodiments of the invention have been described. Nevertheless, it will be understood that various modifications may be made without departing from the spirit and scope of the invention. Accordingly, other embodiments are within the scope of the following claims.

What is claimed is:

1. A liquid ink comprising:
   a) a carrier liquid having a Kauri-Butanol number less than 30;
   b) a plastisol;
   c) a dispersant; and
   d) a charge director
wherein:
   1) where the charge director is a positive charge director, the dispersant has amine groups and the plastisol comprises polymeric particles having acid groups and an acid value between 30 and 150 mg KOH/g such that the mole ratio of the amine groups to the acid groups is between 0.075 and 0.3; and
   2) where the charge director is a negative charge director, the plastisol comprises a polymer having an amine value between 5 and 200 mg KOH/g and the dispersant has acid groups such that the mole ratio of the acid groups to the amine groups is between 0.075 and 0.3.

2. A liquid ink comprising:
   a) a carrier liquid having a Kauri-Butanol number less than 30;
   b) a plastisol having acid groups and an acid value between 30 and 150 mg KOH/g;
   c) a dispersant having amine groups such that the mole ratio of the amine groups to the acid groups is between 0.075 and 0.3; and
   d) a positive charge director.

3. A liquid ink according to claim 2, wherein the plastisol has an acid value between 50 and 120 mg KOH/g.

4. A liquid ink according to claim 3, wherein the ratio of the amine group to the acid groups is between 0.09 and 0.2 by mole.

5. A liquid ink according to claim 2, wherein the positive charge director comprises at least an organic acid metal salt.

6. A liquid ink according to claim 2, wherein the positive charge director comprises zirconium octanoate.

7. A liquid ink according to claim 2, wherein the dispersant comprises a hydrocarbon soluble copolymer derived from dimethylaminoethyl methacrylate.

8. A liquid ink according to claim 2, further comprising at least a colorant.

9. A liquid ink comprising:
   a) a carrier liquid having a Kauri-Butanol number less than 30;
   e) a plastisol having an amine value between 5 and 200 mg KOH/g;

f) a dispersant having acid groups such that the mole ratio of the acid groups to the amine groups is between 0.075 and 0.3; and g) a negative charge director.

10. A liquid ink according to claim 9, wherein the plastisol has an amine value between 30 and 120 mg KOH/g.

11. A liquid ink according to claim 9, wherein the mole ratio of the acid group to the amine groups is between 0.09 and 0.2.

12. A liquid ink according to claim 9, wherein the negative charge director comprises lecithin.

13. A liquid ink according to claim 9, wherein the dispersant comprises a hydrocarbon soluble copolymer derived from at least one monomer selected from the group consisting of acrylic acid, methacrylic acid, and a combination thereof.

14. A liquid ink according to claim 9, further comprising at least a colorant.

15. The liquid ink of claim 1 wherein the plastisol comprises particles having average particle diameters of between 0.5 and 3.5 microns.

16. The liquid ink of claim 1 wherein the plastisol comprises particles having average particle diameters of between 0.6 and 3.0 microns.

17. The liquid ink of claim 1 wherein the plastisol comprises particles having average particle diameters of between 0.75 and 2.5 microns.

18. The liquid ink of claim 9 wherein the plastisol comprises particles having average particle diameters of between 0.5 and 3.5 microns.

19. The liquid ink of claim 9 wherein the plastisol comprises particles having average particle diameters of between 0.6 and 3.0 microns.

20. The liquid ink of claim 9 wherein the plastisol comprises particles having average particle diameters of between 0.75 and 2.5 microns.

21. A process for providing an image comprising placing a distribution of charge on a surface, applying the liquid ink of claim 1 to the surface so that the ink is differentially attracted to the distribution of charge, thereby forming an image on the surface.

22. The process of claim 21 wherein the distribution of charge is formed by placing a uniform charge on the surface, and then dissipating the charge in an imagewise distribution.

* * * * *